United States Patent
Ding et al.

(10) Patent No.: US 10,261,624 B2
(45) Date of Patent: Apr. 16, 2019

(54) TOUCH CONTROL DISPLAY PANEL, METHOD OF MANUFACTURING THE SAME, DRIVING METHOD, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Weijie Zhao, Beijing (CN); Shengji Yang, Beijing (CN); Wei Liu, Beijing (CN); Yingming Liu, Beijing (CN); Hongjuan Liu, Beijing (CN); Lei Wang, Beijing (CN); Changfeng Li, Beijing (CN); Rui Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 131 days.

(21) Appl. No.: 15/300,450

(22) PCT Filed: Jan. 13, 2016

(86) PCT No.: PCT/CN2016/070747
§ 371 (c)(1),
(2) Date: Sep. 29, 2016

(87) PCT Pub. No.: WO2017/024763
PCT Pub. Date: Feb. 16, 2017

(65) Prior Publication Data
US 2017/0177143 A1 Jun. 22, 2017

(30) Foreign Application Priority Data

Aug. 11, 2015 (CN) .......................... 2015 1 0491364

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC . G06F 2203/04111; G06F 2203/04103; G06F 2203/04107; G06F 3/044;
(Continued)

(56) References Cited

U.S. PATENT DOCUMENTS

| 2010/0123845 A1 | 5/2010 | Kim et al. |
| 2015/0091846 A1 | 4/2015 | Small |
| 2015/0130753 A1 | 5/2015 | Woo et al. |

FOREIGN PATENT DOCUMENTS

| CN | 104536629 A | * | 4/2015 |
| CN | 104536637 A | * | 4/2015 |

(Continued)

OTHER PUBLICATIONS

The First Chinese Office Action dated Jul. 5, 2017, Appln. No. 201510491364.9.
(Continued)

*Primary Examiner* — Julie Anne Watko
(74) *Attorney, Agent, or Firm* — Ladas & Parry LLP

(57) ABSTRACT

A touch control display panel and a manufacturing method thereof, a driving method, and a display device are disclosed. The touch control display panel includes a plurality of pixel units configured on the array substrate in an array;
(Continued)

the array substrate further includes a plurality of self capacitance touch control electrodes, which are arranged in an array, and each of which includes a plurality of electrode blocks, which have a one-to-one correspondence relationship with the plurality of pixel units; the array substrate further includes a plurality of touch control lead wires, which have a one-to-one correspondence relationship with the plurality of self capacitance touch control electrodes, the touch control lead wires are provided in gaps between adjacent columns of pixel units, which are corresponding to the plurality of self capacitance electrodes for touch control, and the plurality of self capacitance electrodes for touch control are connected with a touch control chip through the corresponding touch control lead wires.

18 Claims, 3 Drawing Sheets

(52) U.S. Cl.
CPC .............. *G06F 2203/04103* (2013.01); *G06F 2203/04107* (2013.01); *G06F 2203/04111* (2013.01)

(58) Field of Classification Search
CPC ... G06F 3/041; G06F 3/03; G06F 3/01; G06F 3/00; G06F 3/0412; G06F 3/0416
See application file for complete search history.

(56) References Cited

FOREIGN PATENT DOCUMENTS

| | | |
|---|---|---|
| CN | 104636012 A | 5/2015 |
| CN | 204679990 A | 9/2015 |
| CN | 104991690 A | 10/2015 |
| CN | 105094422 A | 11/2015 |

OTHER PUBLICATIONS

Second Chinese Office Action dated Nov. 15, 2011; Appln. No. 20150491364.9.
International Search Report and Written Opinion dated Apr. 28, 2016; PCT/CN2016/070747.

\* cited by examiner

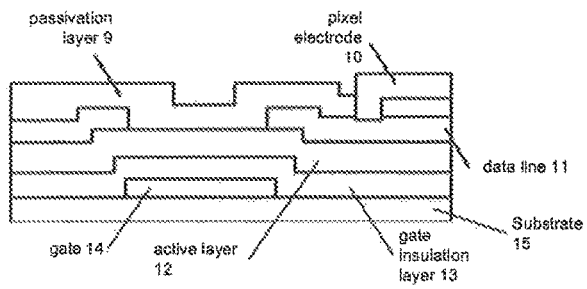

Fig. 6 in a display period, applying a common electrode signal to a touch control lead wire of the touch control display panel, meanwhile, sequentially applying a gate electrode scanning signal to a gate line of the touch control display panel, applying a data signal to a data line — S501 in a touch control period, applying a touch control scanning signal to a touch control lead wire of the touch control display panel, meanwhile, applying a sync signal, which is modulated with the touch control scanning signal, to a gate line and a data line of the touch control display panel, in addition, the touch control lead wire also transmitting a touch control signal, which is generated at a location where a touch control operation occurs, to a touch control chip, and then the touch control chip determines a location of a touch control point according to the touch control signal — S502

Fig. 7

TOUCH CONTROL DISPLAY PANEL, METHOD OF MANUFACTURING THE SAME, DRIVING METHOD, AND DISPLAY DEVICE

TECHNICAL FIELD

Embodiments of the present disclosure relate to a touch control display panel and a manufacturing method thereof, a driving method, and a display device.

BACKGROUND

With the development of display technologies, display technologies are extensively applied in televisions, mobile phones, and for displaying public information, and large size display panels gradually become an important part of daily life. With the rapid development of display technologies, touch screen panels are spread all over people's daily life. Nowadays, excellent functional experience is an important factor pursued by customers, touch control performance is always a major drawback of large size display panels, and the touch control performance is either limited by technologies or costs.

SUMMARY

Embodiments of the present disclosure provide a touch control display panel and a manufacturing method thereof, a driving method, and a display device, which can reduce the coupling capacitance between an electrode block and a gate line as well as data line, the load can be accordingly reduced, and excellent touch control performance of a large size display panel can be realized.

An embodiment of the present disclosure provides a touch control display panel, comprising: an array substrate and a plurality of pixel units arranged in an array on the array substrate; the array substrate further comprises a plurality of self capacitance touch control electrodes, the plurality of self capacitance touch control electrodes are arranged in an array, each of the self capacitance touch control electrodes comprises a plurality of electrode blocks, which are corresponding to the plurality of pixel units; the array substrate further comprises a plurality of touch control lead wires, which have a one-to-one correspondence relationship with the plurality of self capacitance touch control electrodes, the touch control lead wires are provided in gaps between adjacent columns of pixel units, which are corresponding to the plurality of self capacitance touch control electrodes, and the plurality of self capacitance touch control electrodes are connected with a touch control chip through the corresponding touch control lead wires; the plurality of self capacitance touch control electrodes are configured to function as common electrodes in a display period, while function as touch control electrodes in a touch control period; the touch control lead wires are configured for transmitting a common electrode signal to the common electrodes in a display period, while transmitting a touch control scanning signal to the self capacitance touch control electrodes in a touch control period, the touch control lead wires are also configured for transmitting a touch control signal to the touch control chip, and the touch control signal is generated by the self capacitance touch control electrodes at a position where the touch control operation occurs.

In one possible implementation, for the above touch control display panel provided by the embodiment of the present disclosure, each of the self capacitance touch control electrodes comprises a plurality of electrode blocks arranged in an array, each row comprises at least two electrode blocks, and each column comprises at least two electrode blocks.

In one possible implementation, for the above touch control display panel provided by the embodiment of the present disclosure, the electrode blocks have a same size.

In one possible implementation, for the above touch control display panel provided by the embodiment of the present disclosure, for each of the self capacitance touch control electrodes, a connection line is provided in a gap between adjacent rows of pixel units; for each of the self capacitance touch control electrodes, the plurality of the electrode blocks in each row are connected through the connection line; the connection line is provided on a same layer as a gate line of the array substrate and parallel with the gate line.

In one possible implementation, for the above touch control display panel provided by the embodiment of the present disclosure, for each of the self capacitance touch control electrodes, the touch control lead wire is electrically connected to the corresponding connection line through a via hole.

In one possible implementation, for the above touch control display panel provided by the embodiment of the present disclosure, a data line of the array substrate is provided above the touch control lead wires, and the data line and the touch control lead wires are insulated with each other; and an orthographic projection of the data lines on the array substrate and an orthographic projection of the touch control lead wires on the array substrate overlap with each other.

Another embodiment of the present disclosure further provides a method of manufacturing the above touch control display panel provided by the embodiment of the present disclosure, comprising: forming a pattern of self capacitance touch control electrodes, which are provided in an array, on a base substrate, each of the self capacitance touch control electrodes comprises a plurality of electrode blocks, the plurality of electrode blocks have a one-to-one correspondence relationship with a plurality of pixel units, wherein the plurality of self capacitance touch control electrodes are configured to function as common electrodes in a display period while function as touch control electrodes in a touch control period; forming a pattern of touch control lead wires on the base substrate with the pattern of self capacitance touch control electrodes, wherein the touch control lead wires have a one-to-one correspondence relationship with the self capacitance touch control electrodes, and the pattern of touch control lead wires is configured in gaps between adjacent columns of pixel units; the touch control lead wires are configured for transmitting a common electrode signal to the common electrodes in a display period while transmitting a touch control scanning signal to the self capacitance touch control electrodes in a touch control period, the touch control lead wires are also configured for transmitting a touch control signal to a touch control chip, and the touch control signal is generated by the self capacitance touch control electrodes at a position where the touch control operation occurs.

For example, the plurality of electrode blocks have a one-to-one correspondence relationship with a plurality of pixel units.

In one possible implementation, the method of manufacturing the above touch control display panel provided by the embodiment of the present disclosure, after the pattern of the self capacitance touch control electrodes is formed, and before the pattern of the touch control lead wires is formed, further comprises: forming a pattern of gate electrodes and a pattern of connection lines on the base substrate with the pattern of self capacitance touch control electrodes by a single patterning process.

In one possible implementation, the method of manufacturing the above touch control display panel provided by the embodiment of the present disclosure, after the pattern of the connection line is formed, and before the pattern of the touch control lead wires is formed, further comprises: forming a pattern of a first insulation layer with via holes therein on the base substrate with the pattern of the connection lines, wherein the pattern of the touch control lead wires is electrically connected to the corresponding pattern of the connection lines through the via holes.

In one possible implementation, the method of manufacturing the above touch control display panel provided by the embodiment of the present disclosure, after the pattern of the touch control lead wires is formed, further comprises: sequentially forming a pattern of a second insulation layer and a pattern of data lines on the base substrate with the pattern of the touch control lead wires; wherein, an orthographic projection of the data lines on the array substrate and an orthographic projection of the touch control lead wires on the array substrate overlap with each other.

In one possible implementation, the method of manufacturing the above touch control display panel provided by the embodiment of the present disclosure, after the pattern of the data line is formed, further comprises: sequentially forming a pattern of a passivation layer and a pattern of pixel electrodes on the base substrate with the pattern of the data lines.

Another embodiment of the present disclosure further provides a driving method for the above touch control display panel provided by the embodiment of the present disclosure, comprising: in a display period, applying a common electrode signal to a touch control lead wire of the touch control display panel, meanwhile, sequentially applying a gate electrode scanning signal to a gate line of the touch control display panel and applying a data signal to a data line; in a touch control period, applying a touch control scanning signal to the touch control lead wire of the touch control display panel, meanwhile, applying a sync signal, which is modulated with the touch control scanning signal, to the gate line and the data line of the touch control display panel, wherein, in addition, the touch control lead wire also transmits a touch control signal, which is generated at a location where a touch control operation occurs, to a touch control chip, and then the touch control chip determines the location of a touch control point according to the touch control signal.

Another embodiment of the present disclosure further provides a display device, comprising the above touch control display panel provided by the embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 6 is a schematic diagram of sequentially forming a pattern of a passivation layer and a pattern of pixel electrodes on the base substrate with the pattern of the data line; and FIG. 7 is a flow chart of a driving method for the touch control display panel provided by the embodiment of the present disclosure.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
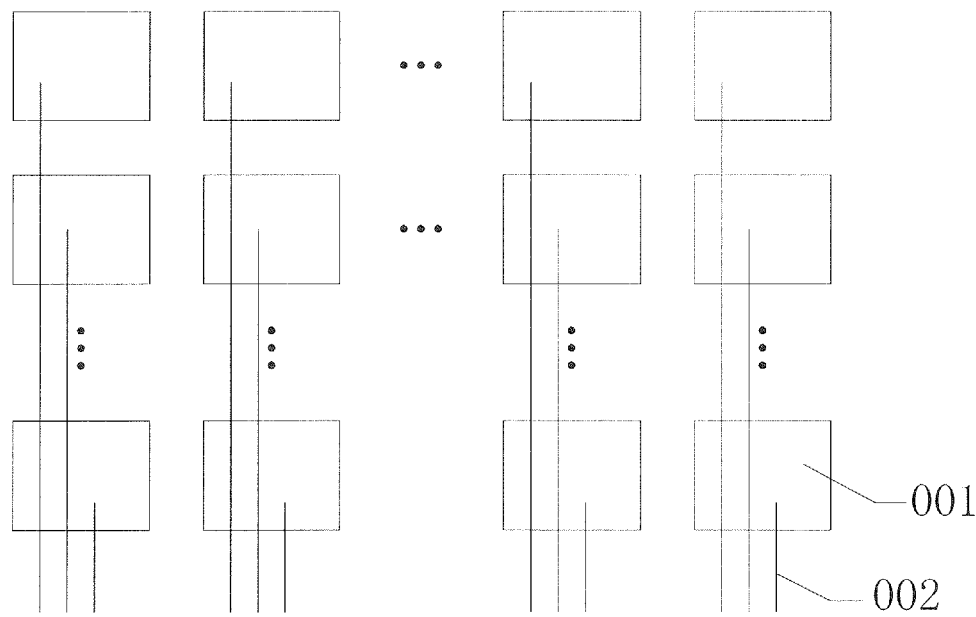
FIG. 1 is a structural schematic diagram of a touch control display panel of the conventional technology.

Built-in (in-cell) touch control panels have, for example, three types: resistance touch control panels, capacitance touch control panels, and optical touch control panels; corresponding built-in touch control technologies have preliminarily applied in small size display panels, and the excellent touch control performance provides the direction for future touch control designs; therefore, it also provides the direction for realizing excellent touch control performance in large size display panels. In a small size touch control screen, as illustrated in FIG. 1, common electrodes will multiplexed or reused as self capacitance touch control electrodes 001 in a touch control period, each of the self capacitance touch control electrodes 001 is connected to a touch control chip through a touch control lead wire 002; because of the large overlap area between the self capacitance touch control electrode 001 and a gate line and a data line provided on the base substrate, the generated coupling capacitance is very large, the coupling capacitance brings about interference between touch control signals and display signals, and the coupling capacitance also limits the touch control driving frequency.

Therefore, how to realizing excellent touch control performance in a large size display panel while reducing the coupling capacitance is a technical problem needing prompt solution for those skilled in the related art.

Implementations of a touch control display panel and a manufacturing method thereof, a driving method, and a display device provided by the embodiment of the present disclosure will be described in detail with reference to accompanying drawings. The thickness and shape of films in the accompanying drawings are aiming at describing contents of the present disclosure schematically, and does not indicate the true scales of the touch control display panel.

Figure 2:
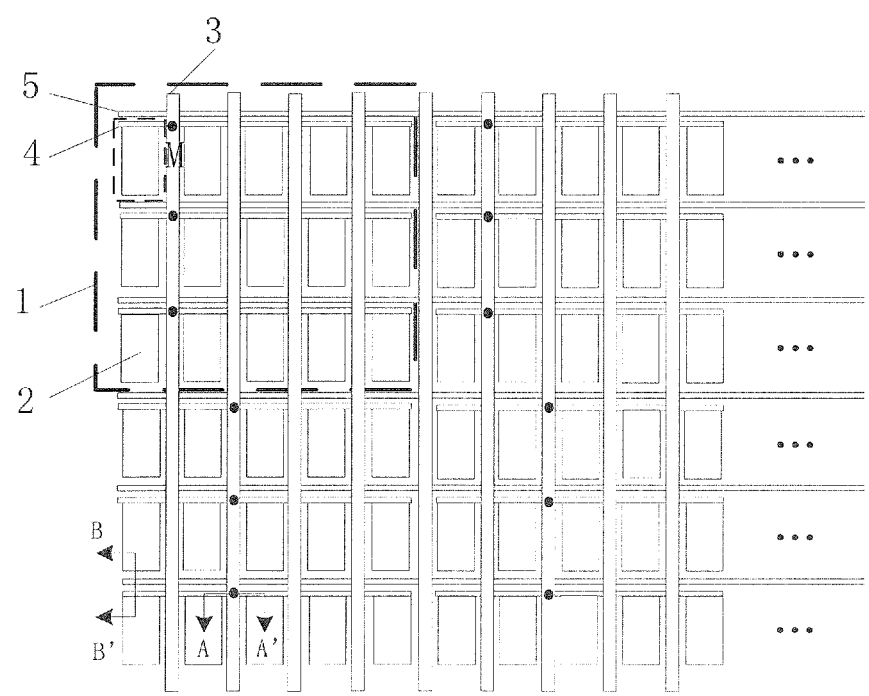
FIG. 2 is a structural schematic diagram of a touch control display panel provided by an embodiment of the present disclosure.

An embodiment of the present disclosure provides a touch control display panel, and as illustrated in FIG. 2, the touch control display panel comprises an array substrate and a plurality of pixel units arranged in an array on the array substrate. The array substrate comprises a plurality of self capacitance touch control electrodes 1, the plurality of self capacitance touch control electrodes 1 are arranged in an array, each of the self capacitance touch control electrodes 1 comprises a plurality of electrode blocks 2, which are corresponding to the plurality of pixel units respectively (for example, in a one-to-one correspondence relationship); the array substrate further comprises a plurality of touch control lead wires 3, which have a one-to-one correspondence relationship with the plurality of self capacitance touch control electrodes 1, the touch control lead wires 3 are configured in the gaps between adjacent columns of the pixel units, which are corresponding to the plurality of self capacitance touch control electrodes 1, and the plurality of self capacitance touch control electrodes 1 are connected with a touch control chip through the corresponding touch control lead wires 3. The plurality of self capacitance touch control electrodes 1 function as common electrodes in a display period, while function as touch control electrodes in a touch control period; the touch control lead wires 3 are configured for transmitting a common electrode signal to the common electrodes in a display period, while transmitting a touch control scanning signal to the self capacitance touch control electrodes 1 in a touch control period; the touch control lead wire 3 also configured for transmitting a touch control signal to the touch control chip, and the touch control signal is generated by the self capacitance touch control electrodes at the position where the touch control operation occurs.

In the above touch control display panel provided by the embodiment of the present disclosure, because each self capacitance touch control electrode comprises a plurality of electrode block, which are corresponding to the plurality of pixel units (for example, in a one-to-one correspondence relationship) and configured in the regions defined by adjacent gate lines and data lines, the electrode blocks do not overlap with the gate lines and data lines, and therefore, the coupling capacitance between the electrode blocks and the gate lines and data lines is reduced, and the load is accordingly reduced and the touch control sensitivity is increased. Furthermore, an embodiment of the present disclosure can configure a touch control lead wire between adjacent columns of pixel units, which are corresponding to the self capacitance touch control electrodes, without additional manufacturing process; therefore, the touch control display panel is integrated with the built-in self capacitance touch control technology; with the integration of a built-in technology and a large size display panel, the excellent touch control performance can be realized in a large size display panel.

For example, for the above touch control display panel provided by the embodiment of the present disclosure, in order to ensure each of the self capacitance touch control electrodes has a suitable size so as to avoid impacting the touch control performance; each of the self capacitance touch control electrodes can comprises, for example, a plurality of electrode blocks, which are arranged in an array, i.e., each of the self capacitance touch control electrodes is an array formed by a certain quantity of rows and columns of electrode blocks; each row has at least two electrode blocks, and each column has at least two electrode blocks. For example, as illustrated in FIG. 2, each of the self capacitance touch control electrodes comprises a plurality of electrode blocks 2, which are arranged in an array, each row has five electrode blocks 2, and each column has three electrode blocks 2. In the implementation process, the quantity of the electrode blocks comprised in each of the self capacitance touch control electrodes is not limited to the quantity illustrated in FIG. 2, the quantity can be determined by the specific condition, and the present disclosure will be not limited thereto.

Furthermore, for example, for the above touch control display panel provided by the embodiment of the present disclosure, the electrode blocks can be formed in the same size to allow more homogeneous distribution of touch control points and an increased touch control performance. As illustrated in FIG. 2, the electrode blocks 2 have a one-to-one correspondence relationship with the pixel units. In another embodiment, each of the pixel units is corresponding to, for example, two electrode blocks 2, i.e., each of the electrode blocks 2 is corresponding to half of the pixel unit, and is not overlapped with the gate lines and data lines.

Figure 3A:
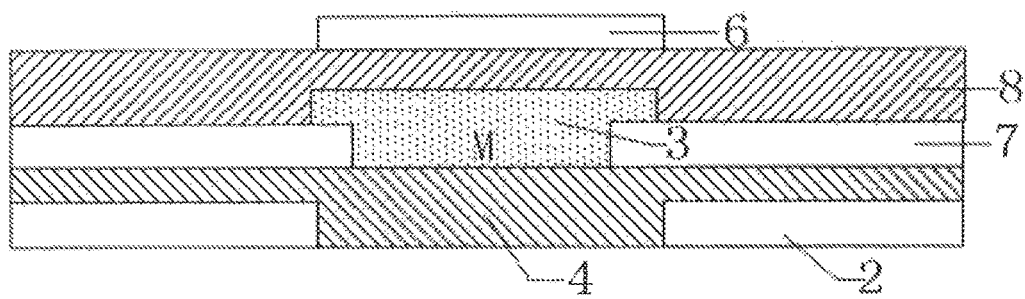
FIG. 3a is a schematically structural cross-sectional view along A-A' direction of FIG. 2.
Figure 3B:
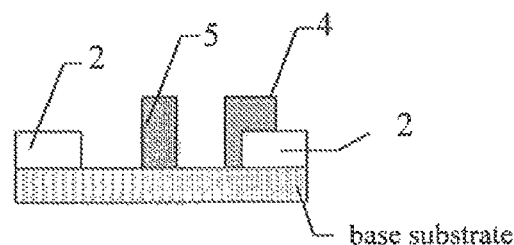
FIG. 3b is a schematically structural cross-sectional view along B-B' direction of FIG. 2.

For example, for the above touch control display panel provided by the embodiment of the present disclosure, in order to connect the plurality of electrode blocks comprised by one self capacitance touch control electrode into an integrity and realize the touch control function of the touch control electrode, as illustrated in FIG. 2, for each of the self capacitance touch control electrodes 1, a connection line 4 is configured in a gap between adjacent rows of pixel units; for each of the self capacitance touch control electrodes 1, the plurality of the electrode blocks 2 in the same row are connected through the connection line 4; in this way, the whole row of electrode blocks 2 can synchronously receive the same signal at the same time period via the connection line. As illustrated in FIGS. 3a and 3b, the connection line 4 can be formed on the same layer as a gate line 5 of the array substrate and parallel with the gate line 5, and the material of the connection line 4 can be the same as the material of the gate line 5. In FIG. 3b, the structures above the connection line 4 and the gate line 5 are not illustrated. Therefore, the gate line 5 and the connection line 4 are formed through a single patterning process during a manufacturing process of the touch control display panel, so short-circuit caused by intersection between the gate line 5 and the connection line 4 can be avoided, and then the process is simplified, the manufacturing process is simple, and the manufacturing cost is reduced.

Figure 4:
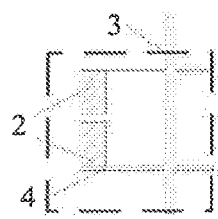
FIG. 4 is a schematic diagram of a sub-pixel unit.

For example, for the above touch control display panel provided by the embodiment of the present disclosure, in order to realize a touch control function and a display function in a touch control period and a display period, respectively, for example, as illustrated in FIG. 2, FIG. 3a, and FIG. 3b, for each of the self capacitance touch control electrodes 1, a first insulation layer 7 is configured between the touch control lead wire 3 and the connection line 4, the first insulation layer 7 comprises a via hole M, and the touch control lead wire 3 is electrically connected to the corresponding connection line 4 through the via hole M. Because the electrode blocks 2 in the same one among the rows of the electrode blocks are connected with the connection line 4, the whole row of electrode blocks 2 can receive the same signal through the connection line 4 when the connection line 4 receives the input signal from the touch control lead wire 3; furthermore, the electrode blocks 2 receive the common electrode signal and the touch control scanning signal in the display period and in the touch control period, respectively, and then drive the touch control display panel to realize a display function and a touch control function in the display period and in the touch control period, respectively. For example, as illustrated in FIG. 4, in the case of each of the sub-pixel units corresponding to two electrode blocks 2, the up-side and the down-side of a row of the sub-pixel units can be respectively provided with one connection line 4, the connection lines 4 are connected to the top electrode block 2 and the bottom electrode block 2 of the row of the sub-pixel units, respectively.

For example, for the above touch control display panel provided by the embodiment of the present disclosure, as illustrated in FIG. 3a, the data lines 6 of the array substrate are configured on the touch control lead wires 3 and insulated with the touch control lead wires 3, and a second insulation layer 8 is configured between the data lines 6 and the touch control lead wires 3; an orthographic projection of the data lines 6 on the array substrate and an orthographic projection of the touch control lead wires 3 on the array substrate overlap with each other, and thus it can be further ensured that the electrode blocks 2 do not overlap with the data lines 6, and therefore, the coupling capacitance is not generated and the touch control sensitivity is increased.

FIG. 3a and FIG. 3b are only some embodiments of the touch control display panel structure, the structure of the touch control display panel is limited to the above-mentioned structures, the structure of the film layers can be decreased, increased or changed to adapt to different types of display panel, and the present disclosure will be not limited thereto.

Based on the same inventive concept, an embodiment of the present disclosure further provides a method of manufacturing the above touch control display panel provided by the embodiment of the present disclosure; because the principle of the method for solving problems is similar to the above-mentioned touch control display panel, the implementation of the method can refer to the implementation of the above-mentioned touch control display panel, and no further redundant description will be provided here.

Figure 5:
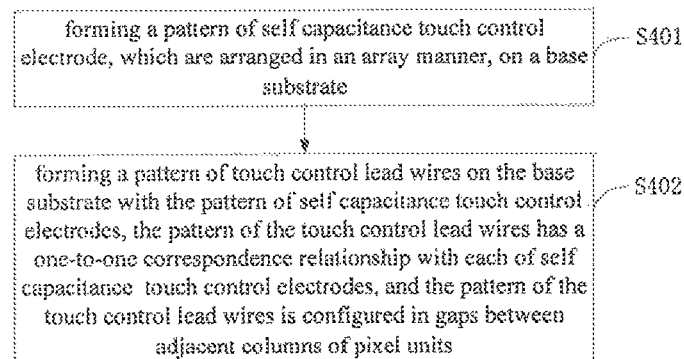
FIG. 5 is a flow chart of a method of manufacturing the touch control display panel provided by an embodiment of the present disclosure.

For example, the method of manufacturing the touch control display panel provided by the embodiment of the present disclosure, as illustrated in FIG. 5, can comprise the following steps:

S401: forming a pattern of self capacitance touch control electrodes, which are arranged in an array, on a base substrate, wherein each of the self capacitance touch control electrodes comprises a plurality of electrode blocks, each of electrode blocks is corresponding to a pixel unit (for example, in a one-to-one correspondence relationship), and the self capacitance electrode functions as common electrodes in a display period while functions as a touch control electrode in a touch control period;

S402: forming a pattern of touch control lead wires on the base substrate with the pattern of the self capacitance touch control electrodes, wherein the touch control lead wires have a one-to-one correspondence relationship with the self capacitance touch control electrodes, and the pattern of the touch control lead wires is configured in gaps between adjacent columns of pixel units, the touch control lead wire is configured for transmitting a common electrode signal to the common electrodes in the display period while transmitting a touch control scanning signal to the self capacitance touch control electrodes in the touch control period, the touch control lead wires are also configured for transmitting a touch control signal to a touch control chip, and the touch control signal is generated by the self capacitance touch control electrodes at the position where the touch control operation occurs.

In the method of manufacturing the above touch control display panel provided by the embodiment of the present disclosure, because of each self capacitance touch control electrode comprises a plurality of electrode block, which are corresponding to the plurality of pixel units (for example, in a one-to-one correspondence relationship) and configured in the regions defined by adjacent gate lines and data lines, the electrode blocks do not overlap with the gate lines and data lines, and therefore, the coupling capacitance between the electrode blocks and the gate lines and data lines are reduced, and the load is accordingly reduced and the touch control sensitivity is increased. Furthermore, without changing or modifying the original laminated structure of the display panel, the common electrodes can be multiplexed or reused as the touch control electrodes and realize the touch control function in the touch control period by means of the touch control lead wires between adjacent columns of the pixel units, which are corresponding to the self capacitance touch control electrodes; therefore, the touch control display panel is integrated with the built-in self capacitance touch control technology without additional manufacturing process; with the integration of built-in technology and a large size display panel, the excellent touch control performance can be realized in a large size display panels.

For example, the method of manufacturing the above touch control display panel provided by the embodiment of the present disclosure, after the pattern of the self capacitance touch control electrodes is formed in step S401, before a pattern of the touch control lead wires is formed in step S402, may further comprise forming a pattern of gate electrodes and a pattern of connection lines on the base substrate with the pattern of the self capacitance touch control electrodes by a single patterning process; therefore, short-circuit caused by overlapping between the gate line and the connection line can be avoided, and then the process is simplified, the manufacturing process becomes simple, and the manufacturing cost is reduced.

For example, the method of manufacturing the above touch control display panel provided by the embodiment of the present disclosure, after the above-mentioned pattern of the connection line is formed, before a pattern of the touch control lead wires is formed in apply step S402, may further comprise forming a pattern of a first insulation layer with a via hole on the base substrate with the pattern of the connection line; the pattern of the touch control lead wires is electrically connected to the corresponding pattern of the connection lines through the via holes. Therefore, the whole row of electrode blocks can receive the same signal through the connection line when the connection line receives the input signal from the touch control lead wire; and further the electrode blocks receive the common electrode signal and the touch control scanning signal in the display period and in the touch control period, respectively.

For example, the method of manufacturing the above touch control display panel provided by the embodiment of the present disclosure, after the pattern of the touch control lead wires is formed in apply step S402, may further comprise: sequentially forming a pattern of a second insulation layer and a pattern of data lines on the base substrate with the pattern of the touch control lead wires; and an orthographic projection of the data lines on the array substrate and an orthographic projection of the touch control lead wire on the array substrate overlap with each other. This configuration allows the data line of the array substrate to be configured on the touch control lead wire, and the data line and the touch control lead wire are insulated with each other; therefore, the configuration can further ensure the electrode blocks do not overlap with the data lines, and therefore, the coupling capacitance is not generated and the touch control sensitivity is increased.

For example, the method of manufacturing the above touch control display panel provided by the embodiment of the present disclosure, after the pattern of the data line is formed, may further comprise sequentially forming a pattern of a passivation layer and a pattern of pixel electrodes on the base substrate with the pattern of the data lines. FIG. 6 is a cross-section view of the passivation layer and the pixel electrode. For example, in order to realize normal display by the touch control display panel, the pattern of the passivation layer and the pixel electrode should be formed on the base substrate with the pattern of the data lines. In this way, the common electrodes provide the common electrode signal for the pixel unit and drives the display panel to realize display function in the display period; in the touch control period, the common electrodes is multiplexed or reused as the self capacitance touch control electrodes and realizes the touch control scanning through the touch control scanning signal inputted via the touch control lead wire; therefore, the touch control signal, which is generated at the location where the touch control operation occurs, is transmitted to the touch control chip through the touch control lead wire and the touch control chip realizes the determination of the touch control point according to the touch control signal.

An embodiment of the present disclosure further provides a driving method for the above touch control display panel provided by the embodiment of the present disclosure, as illustrated in FIG. 7, the driving method can comprises the following steps:

S501: in a display period, applying a common electrode signal to a touch control lead wire of the touch control display panel, meanwhile, sequentially applying a gate electrode scanning signal to a gate line of the touch control display panel, applying a data signal to a data line;

S502: in a touch control period, applying a touch control scanning signal to the touch control lead wire of the touch control display panel, meanwhile, applying a sync signal, which is modulated according to the touch control scanning signal, to the gate line and the data line of the touch control display panel, wherein additionally the touch control lead wire also transmits a touch control signal, which is generated at a location where a touch control operation occurs, to a touch control chip, and then the touch control chip determines a location of a touch control point according to the touch control signal.

In the driving method of the above touch control display panel provided by the embodiment of the present disclosure, the display panel is driven to realize the display function and the touch control function in the display period and the touch control period, respectively. Therefore, time-division driving method is adopted in realizing the touch control and display, and the common electrodes are multiplexed as the touch control electrodes. In a display period, a common electrode signal is applied to a touch control lead wire of the touch control display panel, so as to provide the common electrode signal for the common electrodes; in a touch control period, a touch control scanning signal is applied to a touch control lead wire of the touch control display panel so as to drive the touch control display panel to perform the touch control scanning, meanwhile, a sync signal, which is modulated with the touch control scanning signal, is applied to a gate line and a data line, so as to reduce the coupling capacitance between the touch control electrode and other electrode lines and in turn reduce the RC delay between the touch control electrode and other electrode lines; the touch control lead wire transmits a touch control signal, which is generated at a location where a touch control operation occurs, to a touch control chip, and then the touch control chip determines a location of the touch control point according to the touch control signal. Therefore, the touch control display panel is integrated with the built-in self capacitance touch control technology; with the integration of the built-in technology and large size display panel, the excellent touch control performance can be realized in large size display panels.

An embodiment of the present disclosure further provides a display device, which comprises the above-mentioned display panel provided by the embodiments of the present disclosure. The display device can be any products or components that have display function, such as a cell phone, a tablet computer, a television, a display screen, a laptop, a digital photo frame, or a navigator. It should be understood by those skilled in the related art that the display device comprises other components which are necessary to the display device, no further description will be given to them herein, and they should not be regarded as the limitations upon the present disclosure. The implementation of the display device can refer to the implementation of the above-mentioned touch control display panel; no further redundant description will be given.

The embodiments of the present disclosure provide a touch control display panel and a manufacturing method thereof, a driving method, and a display device. The touch control display panel comprises an array substrate and a plurality of pixel units arranged in an array on the array substrate; the array substrate further comprises a plurality of self capacitance touch control electrodes, which are arranged in an array, each of the self capacitance touch control electrodes comprises a plurality of electrode blocks, which are corresponding to the plurality of pixel units (for example, in a one-to-one correspondence relationship); the array substrate further comprises touch control lead wires, which have a one-to-one correspondence relationship with the self capacitance touch control electrodes, the touch control lead wires are configured in gaps between adjacent columns of pixel units, which are corresponding to the self capacitance touch control electrodes, the self capacitance touch control electrodes are each connected with a touch control chip through corresponding touch control lead wires; the self capacitance touch control electrodes function as common electrodes in a display period, while function as touch control electrodes in a touch control period; the touch control lead wires are configured for transmitting a common electrode signal to the common electrodes in a display period, while transmitting a touch control scanning signal to the self capacitance touch control electrodes in a touch control period, and the touch control lead wires are also configured for transmitting a touch control signal to the touch control chip, and the touch control signal is generated by the self capacitance touch control electrodes at the position where the touch control operation occurs. Because the electrode blocks are corresponding to the pixel units (for example, in a one-to-one correspondence relationship), and provided in the regions defined by adjacent gate lines and data lines, the electrode blocks do not overlap with the gate lines and data lines, and therefore, the coupling capacitance between the electrode blocks and the gate lines and data lines are reduced, and the load is accordingly reduced and the touch control sensitivity is increased, and in turn excellent touch control performance can be realized in large size display panels.

What are described above is related to the illustrative embodiments of the disclosure only and not limitative to the scope of the disclosure; the scopes of the disclosure are defined by the accompanying claims.

The application claims priority to the Chinese patent application No. 201510491364.9, filed Aug. 11, 2015, the entire disclosure of which is incorporated herein by reference as part of the present application.

What is claimed is:

1. A touch control display panel, comprising: an array substrate and a plurality of pixel units arranged in an array on the array substrate, wherein, the array substrate further comprises a plurality of self capacitance touch control electrodes, the plurality of self capacitance touch control electrodes are arranged in an array, each of the self capacitance touch control electrodes comprises a plurality of electrode blocks, which are corresponding to the plurality of pixel units;

the array substrate further comprises a plurality of touch control lead wires, which have a one-to-one correspondence relationship with the plurality of self capacitance touch control electrodes, the touch control lead wires are provided in gaps between adjacent columns of pixel units, which are corresponding to the plurality of self capacitance touch control electrodes, and the plurality of self capacitance touch control electrodes are connected with a touch control chip through the corresponding touch control lead wires;

the plurality of self capacitance touch control electrodes are configured to function as common electrodes in a display period, while function as touch control electrodes in a touch control period;

the touch control lead wires are configured for transmitting a common electrode signal to the common electrodes in a display period, while transmitting a touch control scanning signal to the self capacitance touch control electrodes in a touch control period, the touch control lead wires are also configured for transmitting a touch control signal to the touch control chip, and the touch control signal is generated by the self capacitance touch control electrodes at a position where the touch control operation occurs;

wherein, a data line of the array substrate is provided above the touch control lead wires, and the data line and the touch control lead wires are insulated with each other; and an orthographic projection of the data lines on the array substrate and an orthographic projection of the touch control lead wires on the array substrate overlap with each other.

2. The touch control display panel according to claim 1, wherein, each of the self capacitance touch control electrodes comprises a plurality of electrode blocks arranged in an array, each row comprises at least two electrode blocks, and each column comprises at least two electrode blocks.

3. The touch control display panel according to claim 2, wherein, for each of the self capacitance touch control electrodes, a connection line is provided in a gap between adjacent rows of pixel units;

for each of the self capacitance touch control electrodes, the plurality of the electrode blocks in each row are connected through the connection line;

the connection line is provided on a same layer as a gate line of the array substrate and parallel with the gate line.

4. The touch control display panel according to claim 3, wherein, for each of the self capacitance touch control electrodes, the touch control lead wire is electrically connected to the corresponding connection line through a via hole.

5. The touch control display panel according to claim 2, wherein, the plurality of electrode blocks have a one-to-one correspondence relationship with the plurality of pixel units.

6. The touch control display panel according to claim 1, wherein, the electrode blocks have a same size.

7. The touch control display panel according to claim 1, wherein, for each of the self capacitance touch control electrodes, a connection line is provided in a gap between adjacent rows of pixel units;

for each of the self capacitance touch control electrodes, the plurality of the electrode blocks in each row are connected through the connection line;

the connection line is provided on a same layer as a gate line of the array substrate and parallel with the gate line.

8. The touch control display panel according to claim 7, wherein, for each of the self capacitance touch control electrodes, the touch control lead wire is electrically connected to the corresponding connection line through a via hole.

9. The touch control display panel according to claim 7, wherein, the plurality of electrode blocks have a one-to-one correspondence relationship with the plurality of pixel units.

10. The touch control display panel according to claim 1, wherein, the plurality of electrode blocks have a one-to-one correspondence relationship with the plurality of pixel units.

11. A driving method for a touch control display panel according to claim 1, comprising:

in a display period, applying a common electrode signal to a touch control lead wire of the touch control display panel, meanwhile, sequentially applying a gate electrode scanning signal to a gate line of the touch control display panel and applying a data signal to a data one;

in a touch control period, applying a touch control scanning signal to the touch control lead wire of the touch control display panel, meanwhile, applying a sync signal, which is modulated with the touch control scanning signal, to the gate line and the data line of the touch control display panel, wherein, in addition, the touch control lead wire also transmits a touch control signal, which is generated at a location where a touch control operation occurs, to a touch control chip, and then the touch control chip determines the location of a touch control point according to the touch control signal.

12. A display device, comprising the touch control display panel according to claim 1.

13. The touch control display panel according to claim 1, wherein, the plurality of electrode blocks have a one-to-one correspondence relationship with the plurality of pixel units.

14. A method of manufacturing the touch control display panel, comprising:

forming a pattern of self capacitance touch control electrodes, which are provided in an array, on a base substrate, each of the self capacitance touch control electrodes comprises a plurality of electrode blocks, the plurality of electrode blocks have a one-to-one correspondence relationship with a plurality of pixel units, wherein the plurality of self capacitance touch control electrodes are configured to function as common electrodes in a display period while function as touch control electrodes in a touch control period;

forming a pattern of touch control lead wires on the base substrate with the pattern of the self capacitance touch control electrodes, wherein the touch control lead wires have a one-to-one correspondence relationship with the self capacitance touch control electrodes, and the pattern of the touch control lead wires is configured in gaps between adjacent columns of pixel units; the touch control lead wires are configured for transmitting a common electrode signal to the common electrodes in a display period while transmitting a touch control scanning signal to the self capacitance touch control electrodes in a touch control period, the touch control lead wires are also configured for transmitting a touch control signal to a touch control chip, and the touch control signal is generated by the self capacitance touch control electrodes at a position where the touch control operation occurs;

wherein, a data line of an array substrate is provided above the touch control lead wires, and the data line and the touch control lead wires are insulated with each other; and an orthographic projection of the data lines on the array substrate and an orthographic projection of the touch control lead wires on the array substrate overlap with each other.

15. The method according to claim 14, after the pattern of the self capacitance touch control electrodes is formed, and before the pattern of the touch control lead wires is formed, further comprising:

forming a pattern of gate electrodes and a pattern of connection lines on the base substrate with the pattern of the self capacitance touch control electrodes by a single patterning process.

16. The method according to claim 15, after the pattern of the connection line is formed, and before the pattern of the touch control lead wires is formed, further comprising:

forming a pattern of a first insulation layer with via holes therein on the base substrate with the pattern of the connection lines, wherein the pattern of the touch control lead wires is electrically connected to the corresponding pattern of the connection lines through the via holes.

17. The method according to claim 14, after the pattern of the touch control lead wires is formed, further comprising:

sequentially forming a pattern of a second insulation layer and a pattern of data lines on the base substrate with the pattern of the touch control lead wires;

wherein, an orthographic projection of the data lines on the array substrate and an orthographic projection of the touch control lead wires on the array substrate overlap with each other.

18. The method according to claim 17, after the pattern of the data line is formed, further comprising:

sequentially forming a pattern of a passivation layer and a pattern of pixel electrodes on the base substrate with the pattern of the data lines.

* * * * *